July 9, 1957 R. R. THOMPSON 2,799,004
ELECTRICAL WELL LOGGING SYSTEM
Filed April 13, 1953
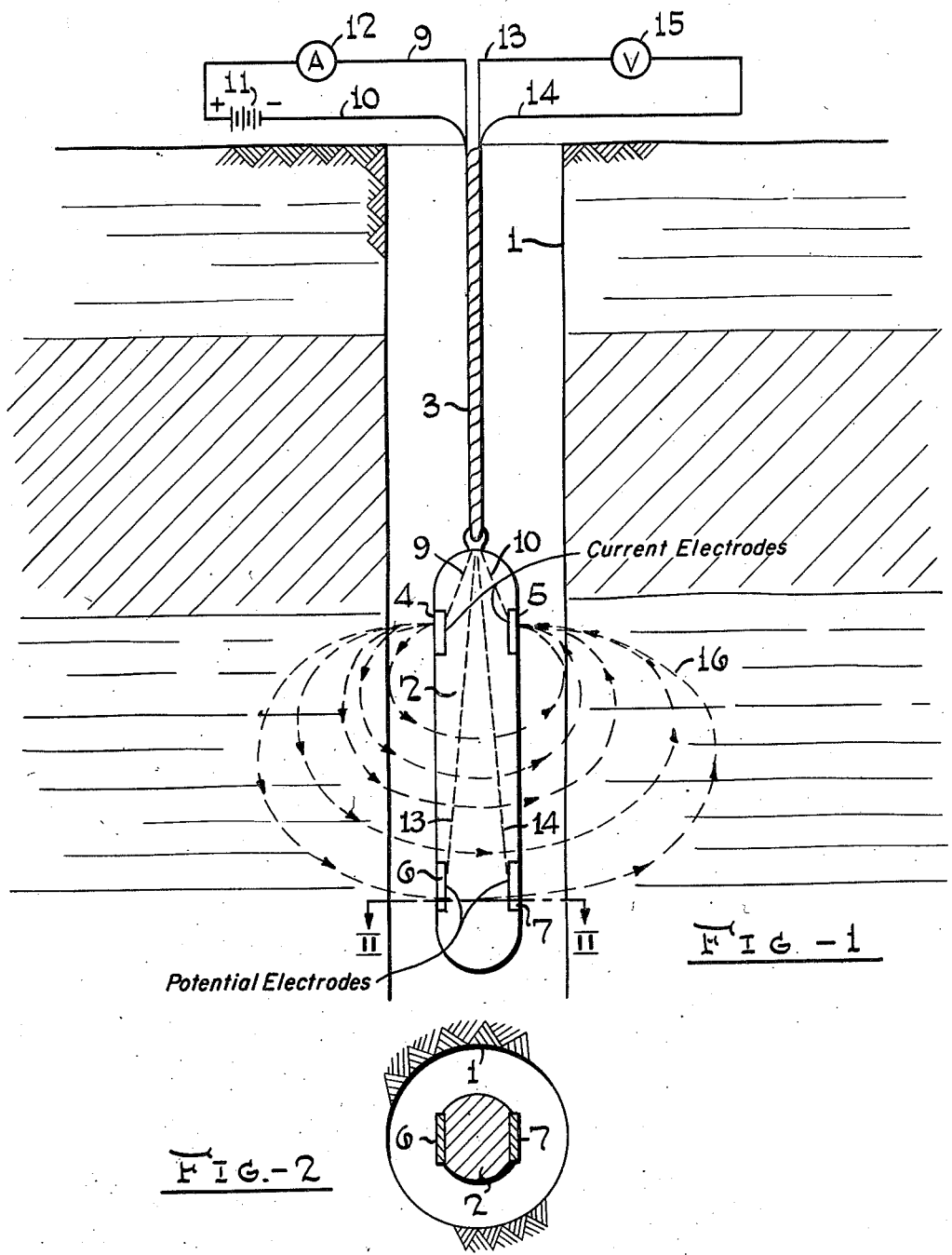
Robert R. Thompson Inventor
By W. O. Heilman Attorney 2,799,004

ELECTRICAL WELL LOGGING SYSTEM

Robert R. Thompson, Tulsa, Okla., assignor to Esso Research and Engineering Company, a corporation of Delaware Application April 13, 1953, Serial No. 348,408

3 Claims. (Cl. 324—1)

This invention relates to what is known as well logging apparatus and is concerned with a new and improved well logging technique by means of which formations traversed by a borehole may be logged with greater definition than has been possible heretofore. The present invention in its preferred form comprises a four-electrode well logging arrangement employing in combination a pair of potential electrodes and a pair of current electrodes. Each of the four electrodes is constructed as a flat plate or small disc. The two current electrodes are positioned in a well bore in essentially the same horizontal plane so that the electrode plates are parallel to each other and are substantially vertical. The potential electrodes are similarly arranged at a spaced vertical distance in the borehole from the current electrodes. The course of current flow through the borehole and the adjacent earth with this particular arrangement of electrodes is favorable to the identification of strata boundaries with great precision.

In making resistivity logs in boreholes, it has been common practice for some time to use a number of electrode arrangements. One of the most common electrode arrangements is that known as the four-electrode system. In this technique four spaced electrodes are arranged in a straight line in a manner permitting electrical contact with the earth. Two of these electrodes, which may be the outermost electrodes, for example, are called the input or current electrodes, and are connected to a current source and an ammeter. The remaining two electrodes which may be the inner electrodes are called the potential electrodes. In practice, one of the electrodes (either a current or a potential electrode) is usually a stationary earth contact at the surface of the earth. This, however, does not essentially alter the principle of operation. The current flowing between the input electrodes creates an electric field in the borehole and the adjacent earth between the electrodes. By means of a potentiometer or other voltage measuring device, the drop in potential in this electric field between the two potential electrodes is measured. Knowing the value of the current flowing between the input electrodes, the distance between the electrodes, and the potential difference between the potential electrodes, the specific resistivity of the earth between the potential electrodes can be determined. In addition, it is possible to identfy the interfaces between strata of differing resistivity and the depth or thickness of any particular stratum.

There are several difficulties and disadvantages of this and other electrode logging arrangements which are now employed. For one thing, the permeable formations penetrated by the drill hole are invaded by the drilling fluid to some distance from the bore hole and the resistivity of the zone thus invaded becomes changed from the true resistivity of the undisturbed formation. To minimize the effect of this invaded zone on the resistivity reading and to get a measure of the true formation resistivity it is necessary to separate the electrodes by relatively large distances. In the case of thin formations the electrodes may be spread over a distance larger than the formation thickness so that it becomes impossible to obtain a true resistivity measurement. Another disadvantage is that the potential curves so obtained become badly distorted near the boundary of the formation and it becomes difficult to determine the exact location of the boundaries.

It is the purpose of this invention to overcome these and other disadvantages of presently known electrical logging systems. This is achieved by employing an electrode arrangement in which current electrodes are so positioned and are of such a configuration as to provide a path of current flow which is predominantly horizontal through the borehole at points spaced above or below the current electrodes. Horizontally positioned potential electrodes spaced from the current electrodes can therefore determine potential drops which become a function primarily of the electrical characteristics of adjacent strata. Thereby, resistivity readings and the identification of strata of differing resistivity may be accurately and precisely accomplished. It is a feature of this invention that the arrangement can employ either direct current or alternating current.

A preferred embodiment of the invention is illustrated in the accompanying drawings as an example of the nature and principles of this invention. In these drawings:

Figure 1 diagrammatically illustrates the logging arrangement of this invention showing the down-the-hole electrode arrangement and the essential electrical components.

Figure 2 is a cross-section of Figure 1 along the line II—II to clearly show the critical arrangement of the electrodes.

In the drawings a borehole which has been drilled into the earth is indicated by numeral 1. The logging apparatus to be employed, mounted on a body member 2, is supported in this borehole by means of a cable 3. Cable 3 constitutes a multi-conductor cable to which conductors extend to the electrodes in the borehole. Mounted on the body member 2 are at least four electrodes. While the arrangement can be reversed, it will be assumed that the upper pair of electrodes 4 and 5 are input or current electrodes, while the lower pair of electrodes 6 and 7 are pickup or potential electrodes. Each of the electrodes constitutes a plate of generally flat contour arranged so that the plane of the plate is substantially vertical. The shape or size of the electrodes is not critical, however, although for convenience they may be made to conform generally to the shape of the supporting member. Electrodes 4 and 5 are mounted at the same vertical position on body member 2, while electrodes 6 and 7 are similarly mounted at the same vertical position below electrodes 4 and 5. As illustrated in Figure 2, the electrodes are mounted on the body member 2 so that they are essentially parallel to each other, i. e. so that they are diametrically spaced from each other. In addition, it is important that electrodes 4 and 6 and electrodes 5 and 7 all lie in substantially the same vertical plane. A substantial separation between the upper and lower pairs of electrodes is essential. This separation should be of the order of at least about 2 feet, and it may be as great as about 20 feet.

The sole function of body member 2 is to suitably support the four electrodes in the particular arrangement described. It is, of course, necessary that each of the electrodes be insulated from the others and from the body member. It is desirable that the body member have a configuration suitable to space the electrodes of each pair however, as far apart as practical within the confines of the borehole.

Individual electrical conductors extending from each electrode pass through the cable 3 to the surface of the earth. For simplicity, the actual connection of these conductors to the different electrodes has not been shown.

Conductors 9 and 10 connecting to the current electrodes 4 and 5 may be connected in a series circuit with a source of voltage 11 and a current measuring device or ammeter 12. Electric source 11 may constitute a battery or a generator providing either D. C. or A. C. current. The frequency of current employed is not particularly critical, although it is desirable to employ low frequency alternating current in the event direct current is not used. Conductors 13 and 14 which are connected to the pickup electrodes 6 and 7 are connected to a potential measuring device or a volt meter 15.

For illustrative purposes, paths of current flow from the current electrodes 4 and 5 are illustrated by the dashed lines 16. By virtue of the manner in which these electrodes are positioned in the borehole, the path of current flow will be substantially horizontal across the borehole either above or below the current electrodes. As a result, the potential difference detected by the potential electrodes 6 and 7 will be determined principally by the resistivity of the formation in the earth about the borehole. An electrical log having sharp kicks at formation boundaries is obtainable and a more accurate measurement of formation resistivities can be made.

It is apparent that the principles of this invention may be embodied in other electrode arrangements. For example, it is possible and desirable to employ several pairs of pickup electrodes in addition to the single pair described. These would be positioned at different levels along the body member of the apparatus. Again it is apparent that in applying the principles of this invention, modifications and refinements of the apparatus described may be employed. For example, centering springs may be used with the apparatus in order to maintain the electrodes in alignment with the borehole and at a fixed spacing from the walls of the borehole. These and other modifications of the invention may be made within the scope of the invention.

What is claimed is:
1. A method for the electric logging of a bore hole which comprises transmitting current between two horizontally spaced points within the bore hole, simultaneously detecting the resultant induced potential difference between two horizontally spaced points in the bore hole, said last named points being in substantially the same vertical plane as the first named points and spaced vertically therefrom.

2. An electrical well logging apparatus comprising a body member adapted to be moved within a bore hole, two pairs of electrodes mounted on said body member, all of said electrodes insulated from one another and from the body member, the electrodes being arranged on said body member in a manner such that the centers of all of said electrodes are in substantially the same vertical plane when positioned within the bore hole and such that one of said pairs of electrodes is spaced vertically from the second pair and the electrodes in each pair are on opposite sides of the body member, a source of electric current connected to one of said pairs of electrodes, and means for detecting potential differences connected to the other pair of electrodes.

3. An apparatus as defined in claim 2 in which the two pairs of electrodes are spaced vertically from one another a distance within the range from at least about 2 feet to about 20 feet.

References Cited in the file of this patent
UNITED STATES PATENTS

| | | |
|---|---|---|
| 2,184,338 | Ennis | Dec. 26, 1939 |
| 2,199,367 | Athy et al. | Apr. 30, 1940 |
| 2,400,678 | Archie et al. | May 21, 1946 |
| 2,427,950 | Doll | Sept. 23, 1947 |
| 2,476,137 | Doll | July 12, 1949 |
| 2,655,632 | Murphree | Oct. 13, 1953 |